United States Patent
Stauf et al.

(10) Patent No.: US 7,420,009 B2
(45) Date of Patent: Sep. 2, 2008

(54) LOW-EMISSION ADHESIVE COMPOSITION BASED ON A SOLVENT

(75) Inventors: Wolfgang Stauf, Driedorf (DE); Frank Gahlman, Hilchenbach (DE)

(73) Assignee: Stauf Klebstoffwerk GmbH, Wilnsdorf (DE)

( * ) Notice: Subject to any disclaimer, the term of this patent is extended or adjusted under 35 U.S.C. 154(b) by 0 days.

(21) Appl. No.: 11/231,199

(22) Filed: Sep. 20, 2005

(65) Prior Publication Data

US 2006/0069194 A1    Mar. 30, 2006

(30) Foreign Application Priority Data

Sep. 21, 2004    (DE)  ............... 20 2004 014 691 U

(51) Int. Cl.
*A61K 9/51*      (2006.01)

(52) U.S. Cl. ............... 524/365; 524/391; 524/297; 524/447; 524/425

(58) Field of Classification Search ............... 524/297, 524/365, 391, 447, 425
See application file for complete search history.

(56) References Cited

U.S. PATENT DOCUMENTS 3,770,547 A * 11/1973 Kelsey ............... 156/314
5,416,142 A * 5/1995 Bush et al. ............... 524/113
5,525,656 A * 6/1996 Heiling et al. ............... 524/315
5,962,560 A * 10/1999 Congelio et al. ............... 524/104

* cited by examiner

*Primary Examiner*—Peter D Mulcahy
(74) *Attorney, Agent, or Firm*—Butler, Snow, O'Mara, Stevens & Cannada PLLC

(57) ABSTRACT

Described is a low-emission adhesive, whose polymers are dissolved in a mixture of acetone and ethanol. The adhesive is characterized by very low emissions of solvents, with otherwise equally good properties compared to standard solvent-synthetic resin based adhesives. In particular with respect to viscosity and spreadability, surface tension, depth of penetration, wettability, simplicity and speed of processing, as well as adhesion, gluing strength and adhesive spectrum, the adhesive of the invention is equal to other adhesives based on solvents and thus superior to dispersion-adhesives that are based on aqueous solutions. Due to its low solvent emissions and absence of chlorinated solvents, the present adhesive is suitable for applications for which only dispersion-adhesives that are based on aqueous dispersions were reserved until now. This is true in particular for applications in enclosed spaces. The adhesive is very suitable for gluing of wooden floors in internal construction work.

14 Claims, No Drawings

US 7,420,009 B2

LOW-EMISSION ADHESIVE COMPOSITION BASED ON A SOLVENT

RELATED APPLICATIONS

This application claims priority under 35 U.S.C. 119 (a) from German Utility Model Application Number DE 20 2004 014 691 filed Sep. 21, 2004.

FIELD OF THE INVENTION

The present invention relates to an adhesive composition based on solvents, which is due to its low emission values and absence of chlorinated solvents particularly suitable for applications in enclosed spaces.

BACKGROUND OF THE INVENTION

Commercially available adhesive can be divided into four categories based on their composition: hot melt adhesives, reaction resin adhesives, adhesives that are based on aqueous dispersions and adhesives that are based on solvents.

Hot melt adhesives are generally applied by means of a conventional extrusion and coating technique at temperatures between 100 and 300° C. onto one of two surfaces to be attached by gluing. The other, "cold" surface is then brought into contact with the coated surface, whereby the melt is cooled off and becomes hardened so that a permanent bond is created between the surfaces that are to be glued to each other. Hot melt adhesives are often used in the packing industry and they are used for the manufacturing of self-adhesive layers.

Reaction resin adhesives are characterized by the fact that the polymers enabling the adhesion and the bond are first formed in situ after the application of the adhesive from monomers or from prepolymers. Reaction resin adhesives usually harden very quickly. They are therefore well suited for quick and permanent bonding of contacts which have a small surface area. Products which are in demand in private practice, such as products called "instant adhesives" and "all-purpose adhesives", which are based on methacrylate or cyanoacrylate, belong to this group.

On the other hand, other characteristics are required from adhesives for applications in internal construction. Processing of these adhesive should be easy, it should be possible to process them or have them available for a long period of time, and they should be suitable for application in a wide range of temperatures; furthermore, they should display good initial adhesion characteristics, a wide adhesive spectrum for application to different types of substrate and they should also guarantee a permanent bond lasting for decades. Moreover, in the case of floor adhesives, it is also important that the health risks, which are caused when a person breathes in volatile organic components of adhesives during the processing of adhesives, should be kept as low as possible.

In order to protect the processing personnel, dispersion adhesives are the preferred class. Unfortunately, dispersion adhesives have a number of disadvantages, which result from their composition. The emulsifier encloses relatively long chains of polymers, and this emulsifier is then dispersed again in water. The wetting of the substrate is often insufficient due to a high surface tension of the water and a high polarity. The high evaporation enthalpy of the water means that a long time period is needed for drying of the adhesive. The penetration of the polymer into the surface of the substrate is low due to the size of the dispersed polymer particles. The hardened adhesive film is sensitive to moisture due to the remaining emulsifier.

Adhesives that are based on solvents have the following advantages when compared to adhesives that are based on aqueous dispersions: Due to the clearly lower evaporation enthalpy of the solvents, the adhesives dry much faster (only approximately ⅓ of the energy amount will be required). The low surface tension and the low polarity of the solvents improve the wetting of the substrate. The solvents dissolve a number of substrates and the adhesion is thus improved, in particular on dense, smooth substrates. The polymers are dissolved as isolated chains and therefore penetrate very well into porous substrates. The hardened adhesive film is much less sensitive to moisture.

Reaction resin adhesives play only a minor role in applications performed by skilled workers due to protection of the health of the personnel handling the adhesive. Problems are caused when reactive monomers or prepolymers come into contact with skin, or when reactive, volatile compounds penetrate into the respiratory tract.

Hot melt adhesives cannot be easily handled on a large surface area by skilled workers, which is why they are used only in internal construction and on small surface areas in special cases.

In spite of the technical advantages which are displayed by solvent adhesives, their application is limited. This is due to issues relating to environmental protection, fire protection, and most importantly, protection of the processing personnel. Solvent-based adhesives are employed mainly in the production of adhesive tapes, for gluing foam substances, for gluing of wood flooring, and in the form of contact adhesives.

The task of the present invention is therefore to provide a novel adhesive composition based on solvents which is in compliance with the requirement for protection of the labor force and the environment, in particular in compliance with the upper limit value for organic compounds in air according to TRGS 900 [TRGS=Technical Rules for Dangerous Substances] and the EPA, and which at the same time maintains the advantageous characteristics of solvent-based adhesives.

In accordance with the invention, this task is achieved with an adhesive composition whose main constituents are based on organic solvents acetone and ethanol, using a thermoplastic polymer, preferably polyvinyl acetate, and a hydroxyl-modified thermoplastic resin. The remaining components are additives and additional substances known from prior art. Preferred additives comprise plasticizers and fillers, particularly preferred are siliceous and carbonate fillers, which meet varying technical requirements thanks to their flexible chemical and physical composition, as well as mixing ratios. The adhesive according to the invention can also contain other additives such as rheological additives (for example castor oil derivatives, polyamides), wetting agents, antioxidants or pigments. The composition preferably comprises the following amounts of processed end products:

1 to 12 weight % of acetone, preferably 4 to 8 weight %,
4 to 16 weight % of ethanol, preferably 9 to 13 weight %,
5 to 12 weight % of polyvinyl acetate, preferably 8 to 10 weight %,
10 to 25 weight % of a hydroxyl-modified hydrocarbon resin, preferably 15 to 19 weight %,
0.5 to 5 weight % of plasticizers, preferably 1 to 3 weight %,
35 to 65 weight % of fillers, preferably 45 to 60 weight %,
0 to 5 weight % of additives, preferably 0 to 2.5 weight %

An advantage of the adhesive according to the invention is the fact that solvent emissions, which occur during the processing, are significantly below the current maximum concentration valid for work places (according to TRGS 900) of 960 mg of ethanol per cubic meter of air and of 1,200 mg of acetone for cubic meter of air. This adhesive will be now explained in more detail on preferred embodiment of the adhesive according to the invention. The following is preferably used for the composition of the adhesive:

- 5 weight % of acetone,
- 12 weight % of ethanol
- 8.5 weight % of polyvinyl acetate resin (VINNAPAS B 60, UW 1, UW 10, Wacker Polymer Systems, Burghausen), comprised of a mixture of three polymers which have a median molecular weight of 74,000 g/mol, 150,000 g/mol and 435,000 g/mol, and which are contained with a relative content amount to each other of 5:5:7, wherein the resin with the highest molecular weight also has the highest weight percentage (the molecular weights are determined from the limiting viscosity number η).
- 16.7 weight % of a phenol-modified cumaron-indene resin (Novares CA 90 made by the Ruttgers Chemicals, Duisburg), with a median molecular weight of about 1,000 g/mol (Mw).
- 1.9 weight % of the softener diisobutyl phthalate
- 6 weight % of kaolin
- 49.9 weight % of $CaCO_3$ comprising two grading curves for amorphous chalk and one grading curve for finely crushed crystalline marble

DETAILED DESCRIPTION OF THE INVENTION

The adhesive according to the invention, in spite of its specific characteristics designed to minimize solvent emissions, does not differ in its characteristics relating to technical applications from commercially available solvent based synthetic resin-based wood flooring adhesives and it also possesses the above named advantages of the present adhesive. In particular, the following characteristics suitable for technical applications are distinctly manifested: Rheology (plasticity, stability of the applied adhesive ridges); application time period; and wettability on different substrates; adhesion to different substrates; hardening speed; final strength; shear strength and durability.

The concentration of volatile organic compounds in the air was measured when the adhesive having this composition was used for gluing of wood flooring in enclosed spaces of various sizes (15 to 60 m²). Ethanol and acetone are detected in this manner, which are contained as solvents in the adhesive.

The following measured values were determined according to the BIA standard procedure (BIA=Professional Institute for Work Safety). A probe was used for measurement, placed at a distance of 1.5 m in a central position above the board in the center of the room and the measured values were collected over a period of two hours.

TABLE I

Measurements of Emissions in the Air in the Room

| Measurement No. | Acetone (mg/m³) | Ethanol (mg/m³) |
|---|---|---|
| 1 | 50 | 143 |
| 2 | 69 | 163 |
| 3 | 271 | 444 |
| 4 | 271 | 444 |
| 5 | 62 | 145 |
| 6 | 58 | 120 |
| 7 | 124 | 275 |
| Median Value | 129 | 248 |
| Standard Deviation | 92 | 132 |
| MAK-Value (Upper Limit in Air) | 1200 | 960 |

Table II lists the solvent emissions according to the BIA standard procedure for processing personnel. A measuring probe was placed at a distance of 10 cm from the upper end of the breastbone of the person performing the work. The measured values were collected over a period of 2 hours.

TABLE II

Measurements of Emissions at the Person Handling the Adhesive.

| Measurement No. | Acetone (mg/m³) | Ethanol (mg/m³) |
|---|---|---|
| 1 | 143 | 203 |
| 2 | 181 | 204 |
| 3 | 140 | 226 |
| 4 | 141 | 219 |
| 5 | 300 | 340 |
| 6 | 398 | 389 |
| 7 | 131 | 194 |
| 8 | 125 | 195 |
| 9 | 130 | 241 |
| 10 | 91 | 347 |
| 11 | 336 | 503 |
| 12 | 335 | 503 |
| 13 | 156 | 207 |
| 14 | 128 | 256 |
| 15 | 179 | 306 |
| 16 | 131 | 252 |
| 17 | 270 | 527 |
| 18 | 71 | 170 |
| 19 | 113 | 229 |
| 20 | 138 | 311 |
| 21 | 71 | 170 |
| Median Value | 177 | 285 |
| Standard Deviation | 91 | 109 |
| MAK Value (Upper Limit in Air) | 1200 | 960 |

The measurement method was characterized by: determination of the dimensions of the room; determination of the temperature and of the relative air humidity; an estimation of the ventilation situation; and determination of the median air velocity. Active probe measurements via a PAS pump—(defined air amounts absorption on active charcoal); and desorption and gas chromatography for identification and quantification of substances.

In order to estimate the overall risk to the health of the person installing the floor caused by the emissions of the solvent emissions, German Professional Association performs an evaluation of the determined values. An evaluation index is determined for this purpose for a mixture of substances according to TRGS 403 [TRGS=Technical Rules for Dangerous Substances]. First, a determined concentration is set as a standard for a substance according to the current MAK value (MAK=Maximum Workplace Concentration), which is published in the TRGS (Technical Rules for Dangerous Substances) 900 as the limiting value in the air workplaces. After that, the value is corrected according to a correction factor for a specific group of occupations, taking into account the fact that the situation involving exposure to the substances does not involve the entire median shift duration of 8 hours. In practice, the measurement is based on the assumption that the person installing the floor spends at the most ⅝ hours during his daily work with the application of the adhesive, which is why the MAK standardized measurement values are divided by a factor of 1.6. In the end, the values obtained for all the measured volatile organic compounds are summed up in order to obtain the evaluation index according to TRGS 403.

An evaluation index of 0.37 was therefore established for the measurement in the room (the values in Table I), for the person-based measurements was established an evaluation index of 0.44 (the values in Table II). Both values are clearly below the maximum allowable limiting value of 1 for the evaluation index according to TRGS 403. The total exposure from the viewpoint of the health of the worker to the adhesive according to the invention is therefore clearly within the allowable range.

The limiting values for emissions into air were exceeded by all other solvent-synthetic resins-wood flooring adhesives available on the market, which was established by numerous measurements by professional construction associations. As a consequence of this finding, TRGS 610 was adopted, includes a substitution requirement for flooring adhesives containing high amounts of solvents.

The adhesive according to the invention is therefore characterized by the fact that it is in compliance with limiting values for emissions into air when it is being processed, in contrast to products that are commonly available on the market.

Although the foregoing invention has been described in some detail by way of illustration and example for purposes of clarity of understanding, it will be obvious that certain changes and modifications may be practiced within the scope of the appended claims.

We claim:

1. An adhesive composition based on organic solvents, comprising in a total composition
   1 to 12 weight % of acetone;
   4 to 16 weight % of ethanol;
   5 to 12 weight % of a thermoplastic polymer;
   10 to 25 weight % of a hydroxyl-modified thermoplastic resin, and
   additional substances and additives to the content of 100%.

2. The adhesive composition according to claim 1, characterized by the fact that the total content of the acetone and ethanol is at the most 23 weight % of the adhesive composition.

3. The adhesive composition according to claim 1 characterized by the fact that it contains 2 to 9 weight % of acetone and 8 to 14 weight % of ethanol.

4. The adhesive composition of claim 1, characterized by the fact that the thermoplastic polymer is a vinyl acetate polymer.

5. The adhesive composition according to claim 4, characterized by the fact that the polyvinyl acetate polymer comprises at least two fractions having a different molecular weight distribution.

6. The adhesive composition according to claim 5, characterized by the fact that the difference between the median molecular weights of the polyvinyl acetate polymers is at least 75,000 g/mol.

7. The adhesive composition according to claim 1, characterized by the fact that the hydroxyl-modified thermoplastic resin is a hydroxyl-modified cumaron indene resin.

8. The adhesive composition according to claim 1, characterized by the fact that the hydroxyl-modified thermoplastic resin is a hydrocarbon resin copolymerized with phenol.

9. The adhesive composition according to claim 1, characterized by the fact that the hydroxyl-modified thermoplastic resin consists of polymers whose molecular weights are between 500 and 4000 g/mol.

10. The adhesive composition according to claim 1, characterized the fact that 0.5 to 5 weight % of plasticizer and 35 to 65 weight % of fillers are used as additional substances.

11. The adhesive composition according to claim 10, characterized by the fact that the plasticizer is diisobutyl phthalate.

12. The adhesive composition according to claim 10, characterized by the fact that the fillers are selected from the group consisting of kaolin and calcium carbonate.

13. The adhesive composition according to claim 12, characterized by the fact that the calcium carbonate fillers are amorphous chalk.

14. The adhesive composition according to claim 13, characterized by the fact that the calcium carbonate fillers are crystalline marble.

* * * * *